(12) United States Patent
Kim et al.

(10) Patent No.: US 10,134,315 B2
(45) Date of Patent: Nov. 20, 2018

(54) HEATING PACKAGE TEST APPARATUS AND METHOD OF OPERATING THE SAME

(71) Applicant: Samsung Display Co., Ltd., Yongin-si, Gyeonggi-do (KR)

(72) Inventors: Kyuho Kim, Yongin-si (KR); Hanshin Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 385 days.

(21) Appl. No.: 14/923,290

(22) Filed: Oct. 26, 2015

(65) Prior Publication Data
US 2016/0293075 A1    Oct. 6, 2016

(30) Foreign Application Priority Data

Apr. 1, 2015    (KR) .......................... 10-2015-0046191

(51) Int. Cl.
G09G 3/00       (2006.01)
G01J 3/50       (2006.01)
G09G 3/3225     (2016.01)
G09G 5/02       (2006.01)

(52) U.S. Cl.
CPC .............. *G09G 3/006* (2013.01); *G01J 3/506* (2013.01); *G09G 3/3225* (2013.01); *G09G 5/02* (2013.01); *G09G 2320/0233* (2013.01)

(58) Field of Classification Search
CPC ....... G09G 3/006; G01J 3/506; H01L 27/3244
See application file for complete search history.

(56) References Cited

U.S. PATENT DOCUMENTS

| | | | |
|---|---|---|---|
| 2006/0175965 A1* | 8/2006 | Lim | H01L 51/5265 313/506 |
| 2010/0294933 A1 | 11/2010 | Stratmann et al. | |
| 2011/0063282 A1* | 3/2011 | Yoo | G09G 3/3225 345/214 |
| 2011/0148835 A1 | 6/2011 | Yamazaki et al. | |
| 2013/0021611 A1 | 1/2013 | Tsurutani | |
| 2015/0199934 A1* | 7/2015 | Kimura | G01J 1/32 345/690 |

FOREIGN PATENT DOCUMENTS

| | | |
|---|---|---|
| JP | 2010-32569 (A) | 2/2010 |
| KR | 10-2005-0094532 (A) | 9/2005 |
| KR | 10-2012-0095444 (A) | 8/2012 |

* cited by examiner

*Primary Examiner* — Georgia Y Epps
*Assistant Examiner* — Don Williams
(74) *Attorney, Agent, or Firm* — Lewis Roca Rothgerber Christie LLP (57) ABSTRACT

A heating package test apparatus and a method of operating the same are disclosed. In one aspect, the apparatus includes a plurality of heating package testers configured to i) measure temperatures of a plurality of divided regions included in a display device and ii) one or more characteristics of light output from the divided regions. Each of the heating package testers includes a heater configured to apply heat to a selected one of the divided regions of the display device, an optical window configured to receive the output light, a temperature measurement circuit configured to measure a temperature of the selected divided region of the display device based on the received light, and a brightness measurement circuit configured to measure a brightness change of the selected divided region based on the received light.

21 Claims, 6 Drawing Sheets

HEATING PACKAGE TEST APPARATUS AND METHOD OF OPERATING THE SAME

INCORPORATION BY REFERENCE TO ANY PRIORITY APPLICATIONS

This application claims the benefit of Korean Patent Application No. 10-2015-0046191, filed on Apr. 1, 2015, in the Korean Intellectual Property Office, the disclosure of which is incorporated herein in its entirety by reference.

BACKGROUND

Field

The described technology generally relates to a heating package test apparatus and a method of operating the same.

Description of the Related Technology

An organic light-emitting diode (OLED) display includes OLEDs having a brightness controlled by a current or a voltage and a thin-film transistor (TFT) for driving the OLED. The OLED can include anode and cathode layers for forming an electric field, an organic light-emitting material emit light. The TFT can be an amorphous silicon (Si) TFT, a low temperature poly-silicon (LTPS) TFT, an oxide TFT or the like according to a type of an active layer.

The OLED and the TFT can be provided for each pixel included in a display device, and thus an optical characteristic deviation of each pixel can occur, and the optical characteristic deviation of the pixels included in the display device can cause a decrease in image quality uniformity. Therefore, a power source voltage for providing a driving current can be adjusted when a product is shipped, by taking into account the optical characteristic deviation of the pixels.

SUMMARY OF CERTAIN INVENTIVE ASPECTS

One inventive aspect relates to a heating package test apparatus that includes a plurality of heating package elements capable of measuring temperatures of a plurality of divided regions included in a display device and characteristics of light outputted from the divided regions of the display device, the heating package element including: a heating unit configured to apply heat to a divided region of the display device; an optical window to which light emitted from the divided region of the display device is incident; a temperature measurement unit configured to measure a temperature of the divided region of the display device by using the light incident through the optical window; and a brightness measurement unit configured to measure a brightness change of the divided region of the display device by using the light incident through the optical window.

The heating package element can further include a light transfer unit configured to transfer the light incident through the optical window to the temperature measurement unit and the brightness measurement unit.

The display device, the heating unit, the light transfer unit, and the temperature measurement unit can be arranged along an optical axis direction of the light emitted from the divided region of the display device.

The optical window can be disposed on one surface of the heating unit disposed to face the display device.

The temperature measurement unit can include: an infrared filter capable of passing only infrared light of the light incident through the optical window; and an infrared temperature detector configured to measure a temperature of the divided region of the display device by receiving the infrared light which has passed through the infrared filter.

The brightness measurement unit can include: a plurality of color filters capable of passing only lights of specific wavelength bands among the light incident through the optical window; and a plurality of photodiodes configured to measure a brightness of the divided region of the display device by receiving the lights which have passed through the plurality of color filters.

The brightness measurement unit can be an image capturing unit including a photo sensor semiconductor device.

The light transfer unit can include: a light-concentrating unit configured to concentrate the light incident through the optical window; and a light-dividing unit to which the light which has passed through the light-concentrating unit is incident.

The heating package test apparatus can further include: an analysis unit configured to determine the brightness of the divided region of the display device according to a temperature; and a compensation data calculation unit configured to generate compensation data for the divided region of the display device.

The heating package test apparatus can determine a brightness uniformity of the entire display device by defining any one of the lights which have passed through the plurality of color filters as a first evaluation pattern, define the others of the lights which have passed through the plurality of color filters as a second evaluation pattern or a third evaluation pattern, and calculate compensation data for the second evaluation pattern or the third evaluation pattern according to the determined brightness uniformity of the entire display device.

The heating package test apparatus can further include a communication unit connected to the display device in a wired or wireless manner.

The display device can be an organic light-emitting display device.

The plurality of divided regions of the display device can correspond to a plurality of pixels of the display device.

Another aspect is a method of operating a heating package test apparatus that can measure temperatures of a plurality of divided regions included in a display device and characteristics of light outputted from the divided regions of the display device includes: applying heat to each divided region of the display device by driving a heating unit; displaying at least one evaluation pattern on the plurality of divided regions of the display device; measuring a brightness of the evaluation pattern by using a brightness measurement unit; and generating compensation data for divided regions of which a brightness is less than a reference brightness.

The method can further include transferring the compensation data to the display device by connecting the display device with the heating package test apparatus in a wired or wireless manner.

The method can further include controlling a brightness of each divided region of the display device based on the compensation data transferred to the display device.

The display device can be an organic light-emitting display device.

The plurality of divided regions of the display device can correspond to a plurality of pixels of the display device.

The heating unit can be controlled by an infrared temperature detector configured to measure temperatures of the plurality of divided regions included in the display device.

Another aspect is a heating package test apparatus, comprising: a plurality of heating package testers configured to i) measure temperatures of a plurality of divided regions included in a display device and ii) one or more characteristics of light output from the divided regions. Each of the heating package testers includes: a heater configured to apply heat to a selected one of the divided regions of the display device; an optical window configured to receive the output light; a temperature measurement circuit configured to measure a temperature of the selected divided region of the display device based on the received light; and a brightness measurement circuit configured to measure a brightness change of the selected divided region based on the received light.

In the above heating package test apparatus, each heating package tester further includes a light transfer unit configured to transfer the received light to the temperature measurement circuit and the brightness measurement circuit.

In the above heating package test apparatus, the display device, the heater, the light transfer unit, and the temperature measurement circuit are located along an optical axis direction of the output light.

In the above heating package test apparatus, the optical window is located on a surface of the heater facing the display device.

In the above heating package test apparatus, the temperature measurement circuit comprises: an infrared filter configured transmit only infrared light of the received light; and an infrared temperature measurement circuit configured to measure a temperature of the selected divided region based on the transmitted infrared light.

In the above heating package test apparatus, the brightness measurement circuit comprises: a plurality of color filters configured to transmit only received light having a plurality of predetermined wavelength bands; and a plurality of photodiodes configured to measure a brightness of the divided region based on the light transmitted through the color filters.

In the above heating package test apparatus, the brightness measurement circuit includes an camera comprising a photo sensor semiconductor device.

In the above heating package test apparatus, the light transfer unit comprises: a light concentrator configured to concentrate the received light; and a light receiver configured to receive the concentrated light.

The above heating package test apparatus further comprises: an analyzer configured to determine the brightness of the selected divided region based on the measured temperature of the selected divided region; and a compensation data calculator configured to calculate compensation data to be applied to the selected divided region.

In the above heating package test apparatus, the display device is configured to display i) a first evaluation pattern including any one portion of the light transmitted through the color filters and ii) a second evaluation pattern including the other portions of the light transmitted through the color filters, wherein the analyzer is further configured to determine a brightness uniformity of the entire display device, wherein the compensation data calculator is further configured to calculate compensation data for the second evaluation pattern based on the brightness uniformity of the entire display device.

The above heating package test apparatus further comprises a communication circuit electrically connected to the display device via a wired or wireless connection.

In the above heating package test apparatus, the display device includes an organic light-emitting diode (OLED) display.

In the above heating package test apparatus, each of the divided regions corresponds to groups of a plurality of pixels of the display device.

Another aspect is a method of operating a heating package test apparatus for a display device including a plurality of divided regions, the method comprising: applying heat to each of the divided regions; displaying at least one evaluation pattern on the divided regions of the display device; measuring a brightness of the evaluation; and generating compensation data for the divided regions having a brightness less than a reference brightness.

The above method further comprises: connecting the display device to the heating package test apparatus via a wired or wireless connection; and transferring the compensation data to the display device.

The above method further comprises controlling a brightness of each divided region based on the transferred compensation data.

In the above method, the display device includes an organic light-emitting diode (OLED) display.

In the above method, each of the divided regions corresponds to a plurality of pixels of the display device.

The above method further comprises an infrared temperature measurement circuit is configured to measure temperatures of the divided regions so as to control the heating.

Another aspect is a heating package test apparatus for compensating optical characteristic deviations of a display device, comprising: a heater configured to apply heat to a selected one of a plurality of divided regions included in the display device, wherein each of the divided regions is configured to output light; an optical window configured to receive the output light from the selected divided region; a temperature measurement circuit configured to measure a temperature of the selected divided region based on the received light; and a brightness measurement circuit configured to measure a brightness change of the selected divided region based on the received light.

DETAILED DESCRIPTION OF CERTAIN INVENTIVE EMBODIMENTS

Reference will now be made in detail to exemplary embodiments, examples of which are illustrated in the accompanying drawings, wherein like reference numerals refer to like elements throughout. In this regard, the present exemplary embodiments can have different forms and should not be construed as being limited to the descriptions set forth herein. Accordingly, the exemplary embodiments are merely described below, by referring to the figures, to explain aspects of the present description.

It will be understood that although the terms "first", "second", etc. can be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on," another layer, region, or component, it can be directly or indirectly formed on the other layer, region, or component. That is, for example, intervening layers, regions, or components can be present.

Sizes of elements in the drawings can be exaggerated for convenience of explanation. In other words, since sizes and thicknesses of components in the drawings are arbitrarily illustrated for convenience of explanation, the following embodiments are not limited thereto.

When a certain embodiment can be implemented differently, a specific process order can be performed differently from the described order. For example, two consecutively described processes can be performed substantially at the same time or performed in an order opposite to the described order.

As used herein, expressions such as "at least one of," when preceding a list of elements, modify the entire list of elements and do not modify the individual elements of the list. In this disclosure, the term "substantially" includes the meanings of completely, almost completely or to any significant degree under some applications and in accordance with those skilled in the art. The term "connected" can include an electrical connection.

Figure 1:
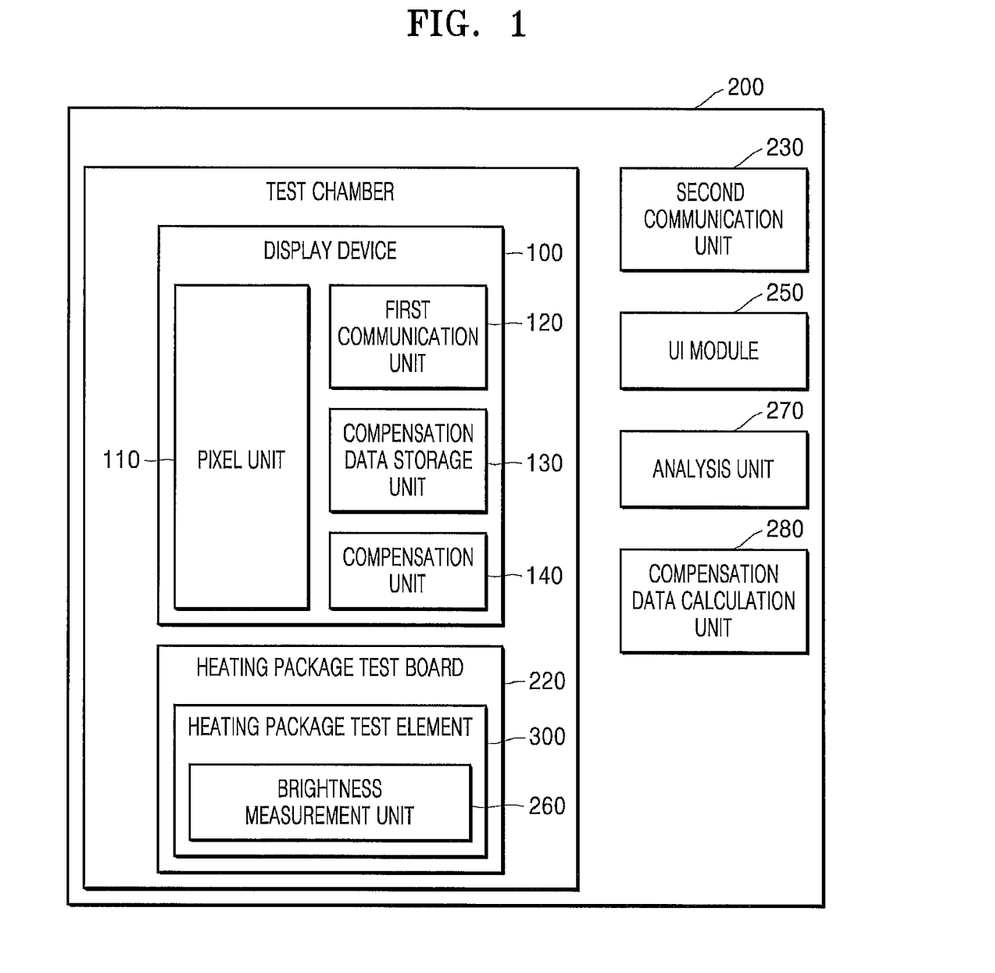
FIG. 1 illustrates a block diagram of a heating package test apparatus according to an exemplary embodiment.
Figure 2:
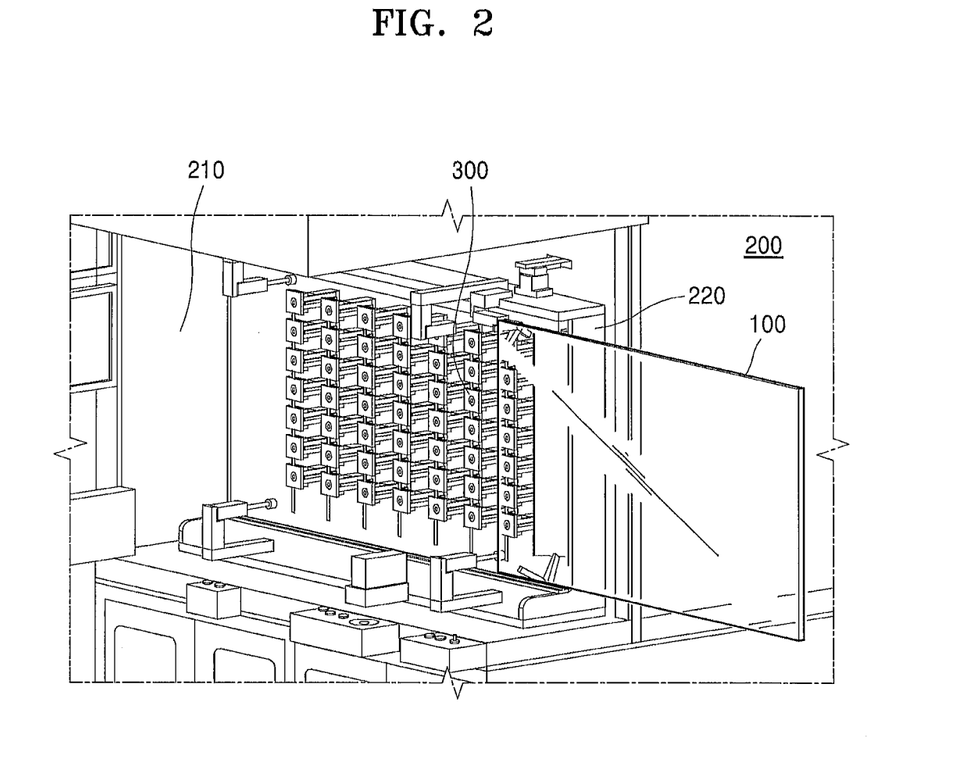
FIG. 2 is a perspective view of the heating package test apparatus according to an exemplary embodiment.

FIG. 1 illustrates a block diagram of a heating package test apparatus 200 according to an exemplary embodiment. Depending on embodiments, certain elements may be removed from or additional elements may be added to the heating package test apparatus 200 illustrated in FIG. 1. Furthermore, two or more elements may be combined into a single element, or a single element may be realized as multiple elements. This also applies to the remaining disclosed embodiments. FIG. 2 is a perspective view of the heating package test apparatus 200 according to an exemplary embodiment.

Referring to FIGS. 1 and 2, a display device 100 according to an exemplary embodiment is described as an organic light-emitting diode (OLED) display as an example, but the present embodiment is not limited thereto. The display device 100 can include a pixel unit (or pixel circuit) 110, a first communication unit (or first communication circuit) 120, a compensation data storage unit (or compensation data storage) 130, and a compensation unit (or compensation circuit) 140. The pixel unit 110 can include a plurality of data lines and scan lines and a plurality of pixels respectively formed in regions where the data lines and scan lines cross each other, wherein each of the pixels can include an OLED and a driving transistor connected thereto. The driving transistor included in each pixel can supply, to the OLED, a data current having an amplitude corresponding to a data signal, the OLED can emit light based on the data current, and accordingly, the display device (OLED display) 100 can display a predetermined image.

The display device 100 can display an evaluation pattern including at least one single-color image on the pixel unit 110. The evaluation pattern can be an image or a picture for measuring a degree of optical characteristic change of the pixel unit 110, and a predetermined evaluation pattern can be previously stored in the display device 100, or the evaluation pattern can be provided from the heating package test apparatus 200. The evaluation pattern can include images or pictures having various shapes and colors. However, since the overall brightness uniformity is supposed to be determined for accurate measurement, the evaluation pattern can include at least one single-color image.

The first communication unit 120 is connected to the heating package test apparatus 200 in a wired or wireless manner to transmit or receive data to or from the heating package test apparatus 200 and can include a plurality of communication modules depending on communication schemes. For example, the display device 100 is connected to the heating package test apparatus 200 in a wired communication scheme such as universal serial bus (USB) or the like. As another example, the display device 100 communicates with the heating package test apparatus 200 in a wireless communication scheme such as Wi-Fi, Bluetooth, or the like.

The compensation data storage unit 130 can store compensation data transmitted from the heating package test apparatus 200. The compensation data is data for compensating for an optical characteristic deviation of the pixel unit 110 and can include position information of regions of which an optical characteristic has changed and information regarding a degree of change of the regions. The display device 100 stores the compensation data in the compensation data storage unit 130 and applies the stored compensation data to image data processing. The stored compensation data can be updated to input new compensation data or deleted or changed under control of a user. For example, the compensation data storage unit 130 includes an electrically erasable programmable read-only memory (EEPROM) or a flash memory.

The compensation unit 140 can control the brightness of the pixel unit 110 according to the compensation data. A compensation process of the compensation unit 140 will be described in detail below.

The heating package test apparatus 200 is an apparatus for measuring a temperature and an optical characteristic, e.g., brightness or color coordinates, of the display device 100. The heating package test apparatus 200 can include a test chamber 210, a heating package test board 220, a second communication unit (or second communication circuit) 230, a user interface (UI) module (or UI circuit) 250, a brightness measurement unit (or brightness measurement circuit) 260, an analysis unit (or analyzer) 270, and a compensation data calculation unit (or compensation data calculator) 280.

The test chamber 210 is a housing part in which the heating package test board 220 and the display device 100 are accommodated, and the internal environment of the test chamber 210 can be maintained constant during a test.

The heating package test board 220 is a support member that can support a plurality of heating package test elements 300 arranged all over the whole surface of the heating package test board 220. For example, when the heating package test board 220 including the heating package test elements 300 is accommodated in the test chamber 210 and is disposed to face the display device 100, position information of regions of the display device 100 of which an optical characteristic has changed and information regarding a degree of change of the regions can be measured. For example, as shown in FIG. 2, the display device 100 and the heating package test board 220 are accommodated inside the test chamber 210, and in this case, the position information of regions of the display device 100 of which an optical characteristic has changed and the information regarding a degree of change of the regions can be measured by disposing the heating package test elements 300, which are arranged in a lattice form on a front surface of the heating package test board 220, to face the pixels of the display device 100.

The second communication unit 230 is connected to the display device 100 in a wired or wireless manner to transmit or receive data to or from the display device 100 and can include a plurality of communication modules depending on communication schemes. For example, the heating package test apparatus 200 is connected to the display device 100 in a wired communication scheme such as USB or the like. As another example, the heating package test apparatus 200 communicates with the display device 100 in a wireless communication scheme such as Wi-Fi, Bluetooth, or the like.

The UI module 250 is configured to provide predetermined optical characteristic change information to the user and to allow the user to input a user command. The UI module 250 can include a touch screen interface for recognizing a touch event which occurs in a display area of the heating package test apparatus 200. Also, the UI module 250 can further include other input/output interface units (not shown) such as a keyboard and a mouse for inputting user command, a printer, and the like.

The brightness measurement unit 260 can recognize the display device 100, measure a brightness of an evaluation pattern according to the display device 100, and transmit the measured brightness to the analysis unit 270. Since a type, a size, a resolution, and the like of a display panel vary depending on types of the display device 100, an evaluation pattern according to a type of the display device 100 can be generated.

The analysis unit 270 can identify the data measured by the brightness measurement unit 260 based on a plurality of divided regions and determine a brightness of each of the plurality of divided regions. For example, the analysis unit 270 determines the entire brightness uniformity based on brightness measured according to a first evaluation pattern and compensate for a measurement error of brightness measured according to a second evaluation pattern, based on the first evaluation pattern.

The compensation data calculation unit 280 generates or calculates compensation data for divided regions of which a brightness is less than a reference brightness. For example, the compensation data calculation unit 280 calculates the reference brightness based on information regarding a type, a size, and a resolution of the display device 100, color information of an evaluation pattern, and the like and calculates a brightness compensation value for a region having a brightness that is not uniform or a region having a brightness that is not identical to the reference brightness, in a measurement image of the evaluation pattern.

Software, e.g., an optical characteristic compensation application, can be installed on at least one of the display device 100 and the heating package test apparatus 200. The optical characteristic compensation application can provide a UI suitable for the contents of an optical characteristic compensation operation. Also, the optical characteristic compensation application can control, directly or through an operating system (OS), components included in the heating package test apparatus 200, e.g., the second communication unit 230, the UI module 250, the brightness measurement unit 260, the analysis unit 270, and the compensation data calculation unit 280.

Figure 3A:
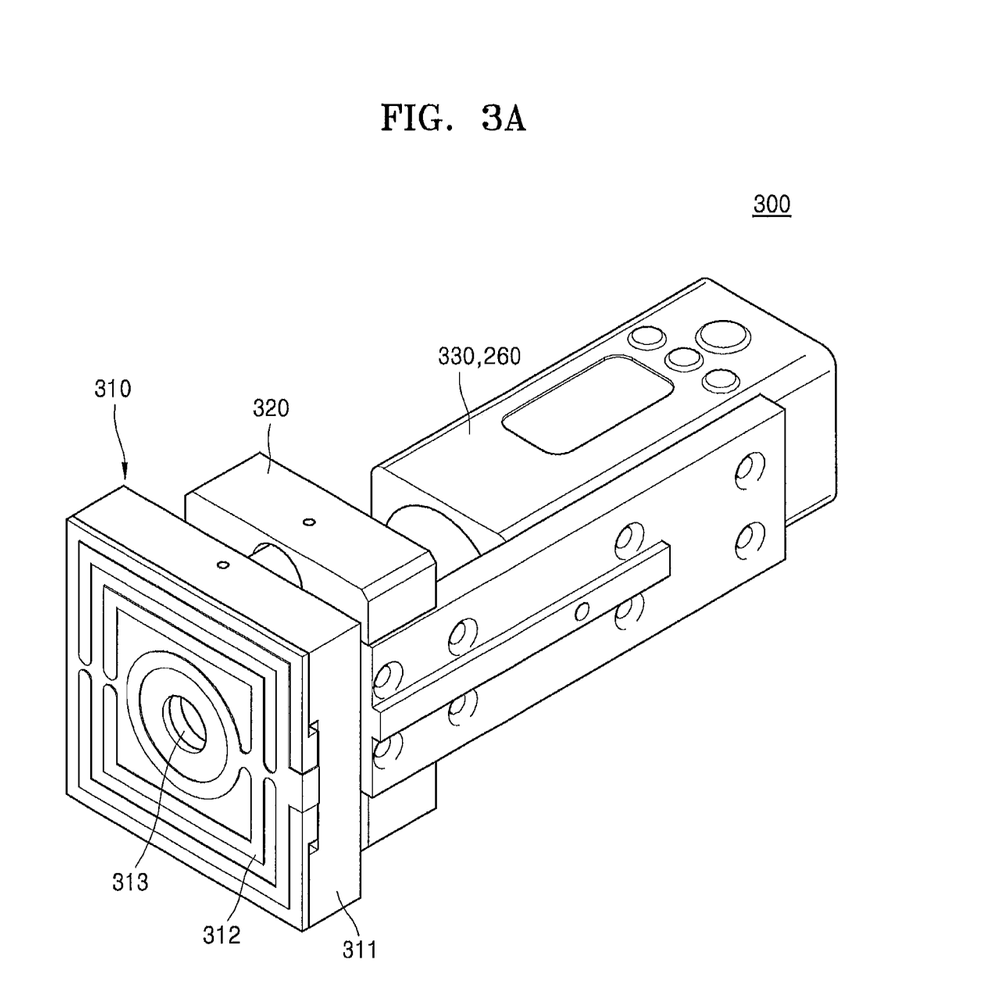
FIG. 3A is a perspective view of a heating package test element for a measurement image, according to an exemplary embodiment.
Figure 3B:
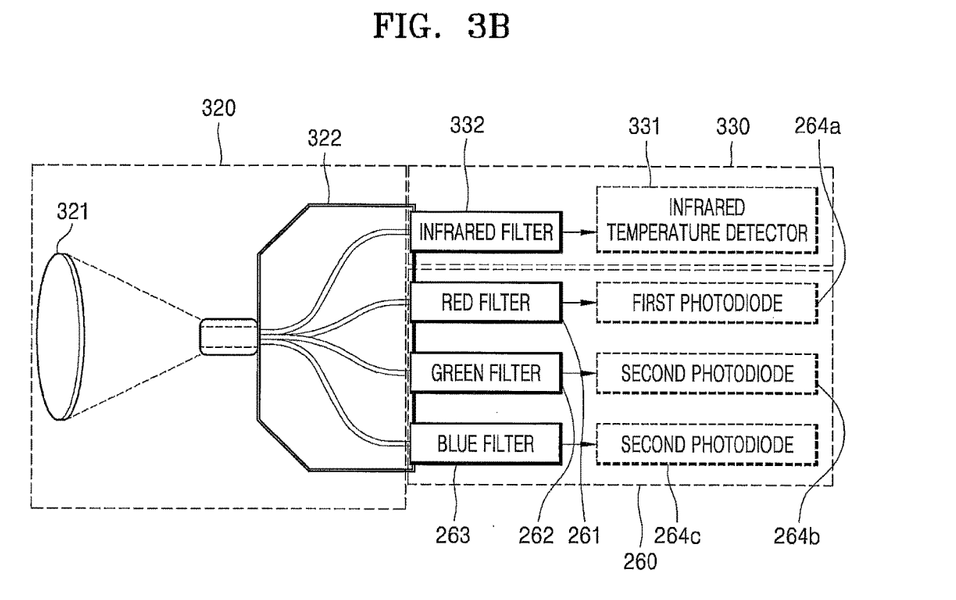
FIG. 3B illustrates a block diagram of the heating package test element for a measurement image, according to an exemplary embodiment.

FIG. 3A is a perspective view of a heating package test element 300 for a measurement image, according to an exemplary embodiment. FIG. 3B illustrates a block diagram of the heating package test element 300 for a measurement image, according to an exemplary embodiment.

The heating package test apparatus 200 according to an exemplary embodiment can apply heat to the display device 100 so that the display device 100 has a constant temperature, to secure position information of regions of the display device 100 of which an optical characteristic has changed and information regarding a degree of change of the regions during a test, and can measure a brightness change of the display device 100 according to the constant temperature state.

Referring to FIGS. 3A and 3B, the heating package test element 300 according to an exemplary embodiment can include a heating unit (heater) 310 that can apply heat to the display device 100, a light transfer unit 320 capable of dividing light incident on the heating package test element 300, a temperature measurement unit (or temperature measurement circuit) 330 that can measure a temperature for each pixel of the display device 100, and a brightness measurement unit 260 that can measure a brightness change for each pixel of the display device 100.

The heating unit 310 is a heating member disposed to face each pixel of the display device 100, and the heating unit 310 can apply substantially constant heat to each pixel of the display device 100. For example, the heating unit 310 includes a housing part (housing) 311, a heating part (or heat emitter) 312 disposed on the front surface of the housing part 311, and an optical window 313. The heating part 312 can apply heat to each pixel of the display device 100. The heating part 312 can include a heat line arranged in a concentric form on the front surface of the housing part 311. For example, the heating part 312 includes a heating coil or the like formed of a resistant material such as gold, silver, copper, or the like, but the present embodiment is not limited thereto. A heating temperature of the heating part 312 can be adjusted by controlling a current that is applied from a power supply unit (not shown). The optical window 313 is a lens part through which light emitted from the display device 100 is incident and can be disposed on the front surface of the housing part 311 disposed to face the display device 100.

The light transfer unit 320 is an optical member that can transfer the light, which is incident through the optical window 313, to the temperature measurement unit 330 and the brightness measurement unit 340 to be described below. The light transfer unit 320 can include a light-concentrating unit (or light concentrator) 321 and a light-dividing unit (or light receiver) 322. The light-concentrating unit 321 is an optical member for concentrating the light incident from the optical window 313 into the light-dividing unit 322, wherein a focal point of the light-concentrating unit 321 can be adjusted to be located at an end portion of the light-dividing unit 322. A configuration of lenses including the light-concentrating unit 321 can be the same as or similar to lens configurations of optical devices being used or other lens configurations that can implement the same function as that of the light-concentrating unit 321.

The light-dividing unit 322 is a light-dividing member for transferring the light received from the light-concentrating unit 321 to the temperature measurement unit 330 and the brightness measurement unit 340 to be described below and can be formed of, for example, a bundle of optical fibers. In this case, one end of the bundle of optical fibers can be located at the focal point of the light-concentrating unit 321, and the light-dividing unit 322 can receive the transferred light at the focal point of the light-concentrating unit 321 and transfer the light through each optical fiber path. The bundle of optical fibers can be provided with a plurality of optical fibers, e.g., three or six optical fibers, in various combinations.

The temperature measurement unit 330 is a temperature measurement member for measuring a temperature of the display device 100. For example, the temperature measurement unit 330 includes a radiation thermometer referred to as an infrared temperature detector 331. The infrared temperature detector 331 is a high-precision contactless temperature detector and can display a temperature value of the display device 100 by receiving thermal radiation energy of the display device 100, which is measured through the light transfer unit 320, converting the received thermal radiation energy into an electrical signal and processing data through a microcomputer (not shown).

The temperature measurement unit 330 can include an infrared filter 332 capable of passing only infrared light into the infrared temperature detector 331 among the light incident from the light-dividing unit 322. Therefore, only the infrared light among the light incident from the light transfer unit 320 can be incident on the infrared temperature detector 331, and accordingly, a temperature of the display device 100 can be measured by receiving thermal radiation energy as infrared rays incident from the display device 100 without direct contact with the display device 100.

The brightness measurement unit 260 can measure a brightness change of each pixel of the display device 100, as described above. For example, the brightness measurement unit 260 includes a plurality of color (red, green, and blue) filters 261, 262, and 263 and first, second, and third photodiodes 264a, 264b, and 264c that can respectively receive lights outputted from the color filters 261, 262, and 263. The light which has been emitted from the display device 100 and has passed through the light-dividing unit 322 can be divided into red light, green light, and blue light according to wavelength bands by the plurality of color filters 261, 262, and 263, and the red light, the green light, and the blue light can be respectively incident on the first, second, and third photodiodes 264a, 264b, and 264c.

In the present embodiment, although the color filters 261, 262, and 263 are described as an example of a configuration that can divide the light which has been emitted from the display device 100 and has passed through the light-dividing unit 322, the present embodiment is not limited thereto. The brightness measurement unit 260 can include an arbitrary configuration that can divide the light which has been emitted from the display device 100 and has passed through the light-dividing unit 322, e.g., a prism or the like. The arbitrary configuration can divide the light which has been emitted from the display device 100 and has passed through the light-dividing unit 322 into red light, green light, and blue light according to wavelength bands. Then, the red light, the green light, and the blue light can be respectively incident on the first, second, and third photodiodes 264a, 264b, and 264c, wherein any one of the red light, the green light, and the blue light is the first evaluation pattern, and the lights having different wavelengths from that of the first evaluation pattern are the second evaluation pattern and a third evaluation pattern.

Referring to FIGS. 2, 3A, and 3B, the analysis unit 270 determines the brightness of each divided region according to a temperature based on first measurement light incident on the first, second, and third photodiodes 264a, 264b, and 264c, thereby determining the brightness uniformity of all the pixels of the display device 100. In this case, brightness error data for each pixel with respect to the second evaluation pattern and the third evaluation pattern incident on the second, and third photodiodes 264b, and 264c can be calculated based on the brightness uniformity of all the pixels, which has been determined based on the first evaluation pattern. Based on the brightness uniformity determined by the analysis unit 270, the compensation data calculation unit 280 can generate compensation data for divided regions of which a brightness is less than the reference brightness and transfer the generated compensation data to the display device 100. The display device 100, the heating unit 310, the light transfer unit 320, and the temperature measurement unit 330 can be located along an optical axis direction of the light incident on the optical window 313.

Figure 4:
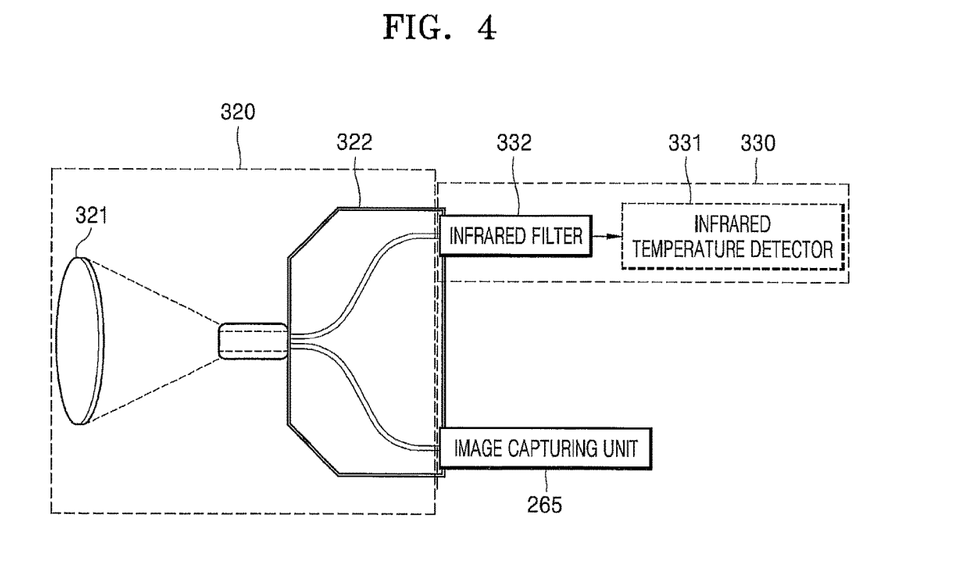
FIG. 4 illustrates a block diagram of a heating package test element for a measurement image, according to another exemplary embodiment.

FIG. 4 illustrates a block diagram of a heating package test element for a measurement image, according to another exemplary embodiment.

Referring to FIG. 4, the brightness measurement unit 260 includes an image capturing unit (or camera) 265 for measuring a brightness change of each pixel of the display device 100. For example, the image capturing unit 265 is a miniaturized digital camera including a photo-sensitive element, and the image capturing unit 265 includes a lens, an iris, and a charge-coupled device (CCD), which is an image capturing element, or a photo sensor semiconductor device such as a complementary metal-oxide semiconductor (CMOS) image sensor (CIS).

The image capturing unit 265 can be disposed at the rear of the light transfer unit 320 and can receive light incident from the light-dividing unit 322. Accordingly, the image capturing unit 265 can capture an image displayed on each pixel of the display device 100. In this case, the heating package test apparatus 200 can further include an analog/digital converter (ADC) for converting an analog signal of light sensed by the image capturing unit 265 into a digital signal, a memory for storing the converted image file, and various kinds of filters for improving image capturing sensitivity and color recognition capability.

Referring to FIGS. 2 and 4, the analysis unit 270 determines the brightness of each divided region according to a temperature by using the captured image incident from the image capturing unit 265 as an evaluation pattern, thereby determining the brightness uniformity of all the pixels of the display device 100. Based on the brightness uniformity determined by the analysis unit 270, the compensation data calculation unit 280 can generate compensation data for divided regions having a brightness that is less than the reference brightness and transfer the generated compensation data to the display device 100.

Figure 5:
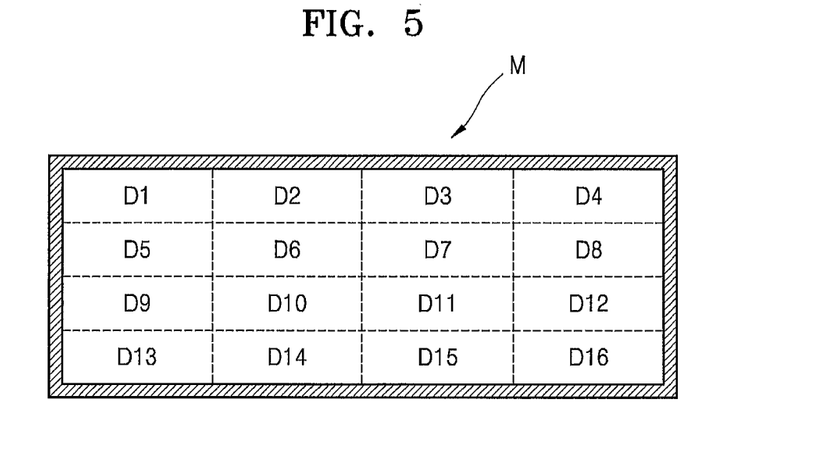
FIG. 5 is a front view of a display device according to an exemplary embodiment.

FIG. 5 is a front view of the display device 100 according to an exemplary embodiment.

The user can directly operate the heating package test elements 300 to generate a brightness measurement image M of the display device 100. In this case, the heating package test apparatus 200 can guide the user with a bright measurement method through the UI module 230. For the brightness measurement image M, since brightness can be measured differently according to a temperature of the display device 100 as described above, the heating package test apparatus 200 can display a predetermined UI menu to guide the user to measure the brightness of the display device 100 at a proper temperature, thereby improving the accuracy of compensation.

The heating package test apparatus 200 divides the brightness measurement image M into a plurality of divided regions D1 to D16, determines the brightness of each of the divided regions D1 to D16, and generates compensation data for divided regions of which a brightness is less than the reference brightness. The compensation data can include position information of the divided regions having a brightness that is less than the reference brightness among the divided regions D1 to D16 and brightness compensation values for the divided regions of which a brightness is less than the reference brightness. In addition, the reference brightness can be determined based on the brightness measurement image M.

Figure 6:
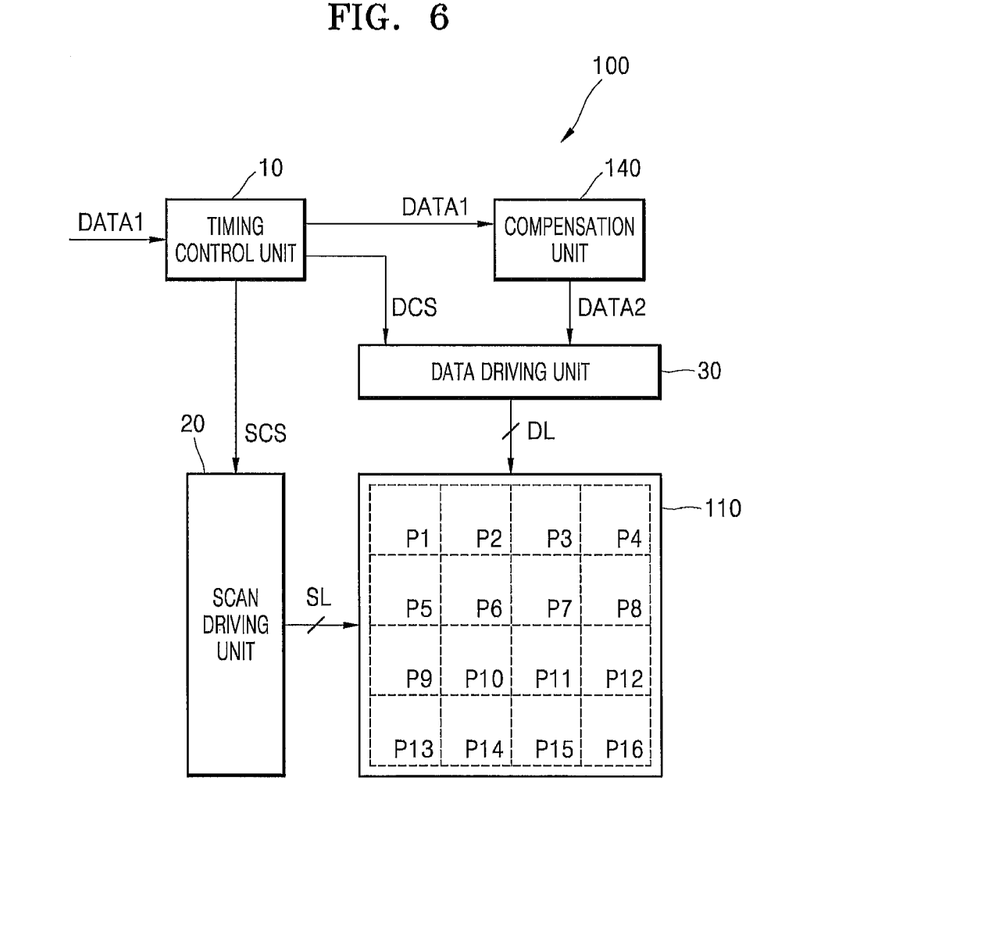
FIG. 6 illustrates a block diagram for describing a bright control of the display device according to an exemplary embodiment.

FIG. 6 illustrates a block diagram for describing a bright control of the display device 100 according to an exemplary embodiment. Depending on embodiments, certain elements may be removed from or additional elements may be added to the display device 100 illustrated in FIG. 6. Furthermore, two or more elements may be combined into a single element, or a single element may be realized as multiple elements. This also applies to the remaining disclosed embodiments.

Referring to FIG. 6, the display device 100 includes the pixel unit (or display panel) 110 and the compensation unit 140. The display device 100 can further include a timing control unit (or timing controller) 10, a scan driving unit (or scan driver) 20, and a data driving unit (or data driver) 30. The pixel unit 110 includes a plurality of pixels (not shown) to which scan lines SL formed in a first direction are connected to transfer a scan signal and data lines DL formed in a second direction crossing the first direction to transfer a data signal are connected and which are arranged in a matrix form. The pixels are respectively formed at portions where the scan lines SL cross the data lines DL and can include an OLED and at least two transistors.

In addition, the pixel unit 110 is partitioned into a plurality of pixel regions P1 to P16 corresponding to the divided regions D1 to D16 of the brightness measurement image M to compensate for an optical characteristic for each region. The pixel regions P1 to P16 of the pixel unit 110 one-to-one correspond to the divided regions D1 to D16 of the brightness measurement image M, and the display device 100 can generate mapping data of the pixel regions P1 to P16 and the divided regions D1 to D16 or can receive the mapping data from an external device (the heating package test apparatus 200). Although the 16-divided pixel regions P1 to P16 and divided regions D1 to D16 have been described as an example in the present embodiment, the shape, number, and size of the pixel regions P1 to P16 and the divided regions D1 to D16 can be variously modified.

The timing control unit 10 receives first image data DATA1 of red, green, and blue, which are input from the outside of the display device 100, and input control signals for controlling display of the first image data DATA1, e.g., a horizontal synchronization signal, a vertical synchronization signal, a clock signal, and the like.

The timing control unit 10 generates driving control signals SCS and DCS for controlling driving of the scan driving unit 20 and the data driving unit 30 based on the input control signals. That is, the scan control signal SCS generated by the timing control unit 10 is provided to the scan driving unit 20, and the data control signal DCS is provided to the data driving unit 30. However, the first image data DATA1 does not directly input to the data driving unit 30 but be input to the compensation unit 140 to change a data voltage value due to optical characteristic compensation.

The scan driving unit 20 can generate a scan signal based on the scan control signal SCS and provide the generated scan signal to the scan lines SL. The scan driving unit 20 is connected to the scan lines SL and transfers the generated scan signal to each of the scan lines SL.

The data driving unit 30 can generate a data signal based on second image data DATA2 of the compensation unit 140 and the data control signal DCS of the timing control unit 10 and provide the generated data signal to the data lines DL.

The compensation unit 140 can control the brightness of a specific pixel region of the pixel regions P1 to P16 of the pixel unit 110, which correspond to the divided regions D1 to D16. Herein, the compensation unit 140 can increase the brightness of the specific pixel region of which the brightness has been lowered due to deterioration or decrease the brightness of the pixel regions other than the specific pixel region. Alternatively, the compensation unit 140 can set a new target brightness and change brightnesses of all the pixel regions P1 to P16. Alternatively, the compensation unit 140 can use a combination of the brightness control methods described above according to an optical characteristic change state and the like.

According to an exemplary embodiment, the compensation unit 140 can control brightness by adjusting a voltage value of image data corresponding to a specific pixel region in which an optical characteristic change has occurred. That is, the compensation unit 140 can convert the first image data DATA1 input from the timing control unit 10 into the second image data DATA2 and provide the second image data DATA2 to the data driving unit 30.

For example, when compensation data provided from the heating package test apparatus 200 or stored in the compensation data storage unit 130 is information for compensating for an optical characteristic by increasing the brightness of a third pixel region P3 by 30 nit, the compensation unit 140 outputs the second image data DATA2 by changing a gradation value of the first image data DATA1 so that the brightness of the third pixel region P3 is increased by 30 nit.

According to another exemplary embodiment, the display device 100 can further include an emission driving unit (not shown) for adjusting a pulse width of an emission signal to be provided to the pixel unit 110, and the compensation unit 140 can control brightness by adjusting an emission time of a specific pixel region in which an optical characteristic change has occurred.

The compensation unit 140 can perform optical characteristic compensation by using at least one of the brightness control methods described above or another well-known brightness control method.

Figure 7:
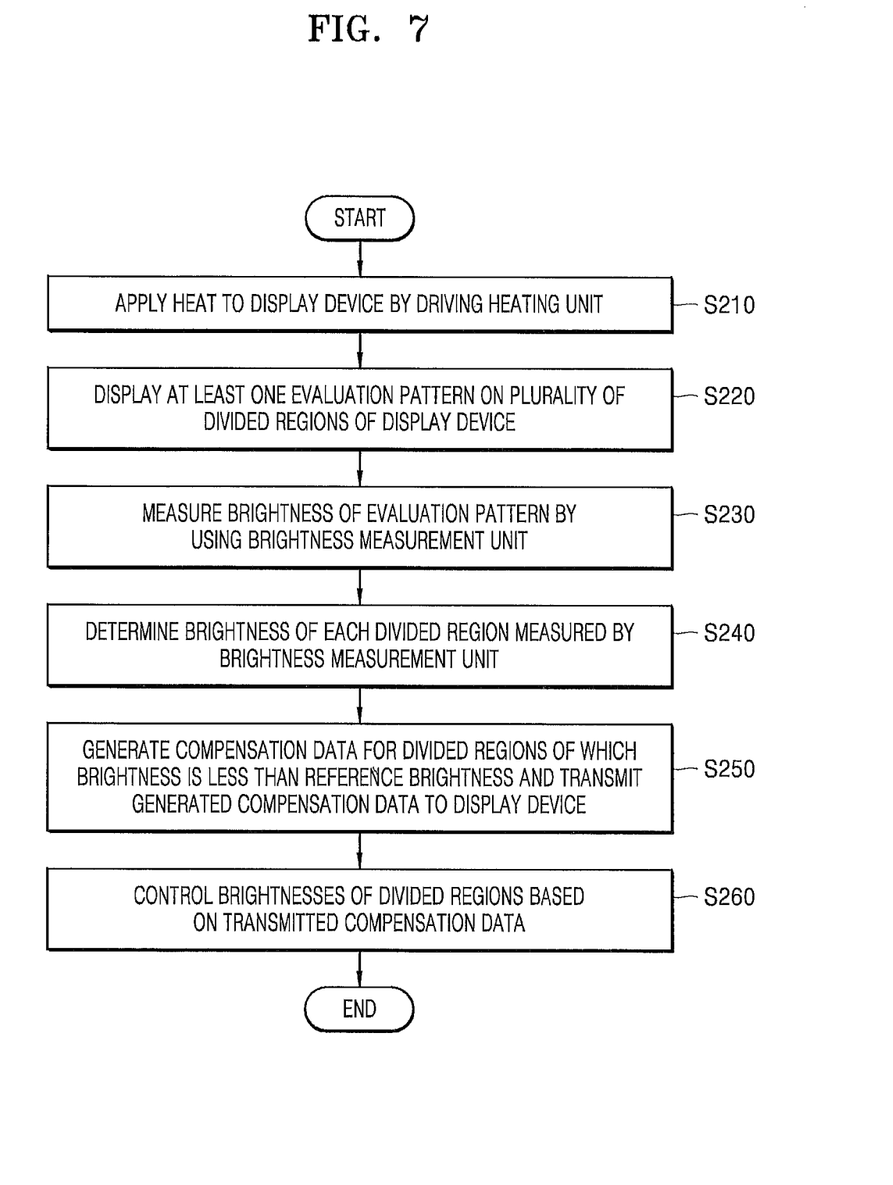
FIG. 7 illustrates a flowchart for describing a method of compensating for an optical characteristic, according to an exemplary embodiment.

FIG. 7 illustrates a flowchart for describing a method of compensating for an optical characteristic, according to an exemplary embodiment.

In some embodiments, the FIG. 7 procedure is implemented in a conventional programming language, such as C or C++ or another suitable programming language. The program can be stored on a computer accessible storage medium of the heating package test apparatus 100, for example, a memory (not shown) of the heating package test apparatus 100. In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software. Depending on the embodiment, additional states can be added, others removed, or the order of the states changed in FIG. 7.

Referring to FIG. 7, in operation S210, the heating package test apparatus 200 according to an exemplary embodiment applies heat to the display unit 100 by driving the heating unit 310. As described above, an optical characteristic of the display unit 100 can vary according to a temperature, and brightness can be changed in a region of which an optical characteristic has changed. The heating package test apparatus 200 according to an exemplary embodiment is to obtain position information of a region of the display device 100, in which an optical characteristic has changed, and to measure a brightness change due to a degree of change of the corresponding region. Therefore, the heating package test apparatus 200 can apply heat to the display device 100 by using the heating unit 310 so that the display device 100 maintains a constant temperature state, and can measure a brightness change in the display device 100 according to the heating. In this case, the heating unit 310 can be controlled using temperature date measured by the infrared temperature detector 331 so that the display device 100 maintains a predetermined temperature state.

In operation S220, the display device 100 displays at least one evaluation pattern on a plurality of divided regions. Herein the evaluation pattern can be light having different wavelengths, such as red light, green light, and blue light, or a captured image.

In operation S230, the heating package test apparatus 200 measures brightness of the evaluation pattern by using the brightness measurement unit 260. In this case, the heating package test apparatus 200 can guide a user with a method of measuring the brightness of the evaluation pattern, by using the UI module 250.

In operation S240, the heating package test apparatus 200 determines the brightness of each of the divided regions D1 to D16, which has been measured by the brightness measurement unit 260. The analysis unit 270 can determine the brightness of each divided region according to a set temperature by using the image capturing unit 265 or the brightness measurement unit 260, thereby determining the brightness uniformity of all the pixels of the display device 100.

In operation S250, the heating package test apparatus 200 generates compensation data for divided regions having a brightness that is less than the reference brightness and transmits the generated compensation data to the display device 100. The heating package test apparatus 200 can divide the brightness measurement image M into the divided regions D1 to D16, determine the brightness of each of the divided regions D1 to D16, and generate compensation data for divided regions of which a brightness is less than the reference brightness.

In operation S260, the display device 100 controls the brightness of the pixel unit 110 based on the compensation data transmitted from the heating package test apparatus 200. The display device 100 can control the brightness of a specific pixel region of the pixel unit 110, which corresponds to a divided region. For example, the compensation unit 140 increases brightness of a specific pixel region of which the brightness has been lowered due to a change in an optical characteristic or decreases the brightness of the pixel regions other than the specific pixel region. Alternatively, the compensation unit 140 can set a new target brightness and change brightnesses of all the pixel regions P1 to P16. Alternatively, the compensation unit 140 can use a combination of the brightness control methods described above according to an optical characteristic change state and the like.

As described above, according to at least the one of the disclosed embodiments, a heating package test apparatus can improve image quality uniformity of a display device by compensating for optical characteristics of pixels.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various, changes in form and details can be made therein without departing from the spirit and scope as defined by the following claims.

What is claimed is:

1. A heating package test apparatus, comprising:
a plurality of heating package testers configured to i) measure temperatures of a plurality of divided regions included in a display device and ii) one or more characteristics of light output from the divided regions, wherein each of the heating package testers includes:
a heater configured to apply heat to a selected one of the divided regions of the display device;
an optical window configured to receive the output light;
a temperature measurement circuit configured to measure a temperature of the selected divided region of the display device based on the received light;
a brightness measurement circuit configured to measure a brightness change of the selected divided region based on the received light;
an analyzer configured to determine the brightness of the selected divided region based on the measured temperature of the selected divided region; and
a compensation data calculator configured to calculate compensation data for the selected divided region based on the brightness determined by the analyzer.

2. The heating package test apparatus of claim 1, wherein each heating package tester further includes a light transfer unit configured to transfer the received light to the temperature measurement circuit and the brightness measurement circuit.

3. The heating package test apparatus of claim 2, wherein the display device, the heater, the light transfer unit, and the temperature measurement circuit are located along an optical axis direction of the output light.

4. The heating package test apparatus of claim 3, wherein the optical window is located on a surface of the heater facing the display device.

5. The heating package test apparatus of claim 2, wherein the light transfer unit comprises:
   a light concentrator configured to concentrate the received light; and
   a light receiver configured to receive the concentrated light.

6. The heating package test apparatus of claim 1, wherein the temperature measurement circuit comprises:
   an infrared filter configured to transmit only infrared light of the received light; and
   an infrared temperature measurement circuit configured to measure a temperature of the selected divided region based on the transmitted infrared light.

7. The heating package test apparatus of claim 1, wherein the brightness measurement circuit comprises:
   a plurality of color filters configured to transmit only received light having a plurality of predetermined wavelength bands; and
   a plurality of photodiodes configured to measure a brightness of the divided region based on the light transmitted through the color filters.

8. The heating package test apparatus of claim 1, wherein the brightness measurement circuit includes an camera comprising a photo sensor semiconductor device.

9. The heating package test apparatus of claim 1, further comprising a communication circuit electrically connected to the display device via a wired or wireless connection.

10. The heating package test apparatus of claim 1, wherein the display device includes an organic light-emitting diode (OLED) display.

11. The heating package test apparatus of claim 1, wherein each of the divided regions corresponds to groups of a plurality of pixels of the display device.

12. The heating package test apparatus of claim 11, further comprising a compensator configured to increase the brightness of at least one of the pixels of which the brightness has been lowered due to deterioration based on the calculated compensation data.

13. The heating package test apparatus of claim 1, wherein the compensation data calculator is configured to calculate the compensation data based on the brightness being less than a reference brightness.

14. The heating package test apparatus of claim 1, wherein the optical window is formed as an opening in the heater.

15. A method of operating a heating package test apparatus for a display device including a plurality of divided regions, the method comprising:
   applying heat to each of the divided regions;
   displaying at least one evaluation pattern on the divided regions of the display device;
   measuring a temperature of the divided regions of the display device;
   determining a brightness of the evaluation pattern on the divided regions based on the measured temperature; and
   generating compensation data for the divided regions based on the determined brightness being less than a reference brightness.

16. The method of claim 15, further comprising:
   connecting the display device to the heating package test apparatus via a wired or wireless connection; and
   transferring the compensation data to the display device.

17. The method of claim 16, further comprising controlling a brightness of each divided region based on the transferred compensation data.

18. The method of claim 15, wherein the display device includes an organic light-emitting diode (OLED) display.

19. The method of claim 15, wherein each of the divided regions corresponds to a plurality of pixels of the display device.

20. The method of claim 15, further comprising an infrared temperature measurement circuit is configured to measure temperatures of the divided regions so as to control the heating.

21. The heating package test apparatus of claim 20, wherein the display device is configured to display i) a first evaluation pattern including any one portion of the light transmitted through the color filters and ii) a second evaluation pattern including the other portions of the light transmitted through the color filters, wherein the analyzer is further configured to determine the brightness uniformity of the entire display device, and wherein the compensation data calculator is further configured to calculate the compensation data for the second evaluation pattern based on the brightness uniformity of the entire display device.

* * * * *